(12) United States Patent
Yeon

(10) Patent No.: US 8,123,535 B1
(45) Date of Patent: Feb. 28, 2012

(54) CHARGING CONNECTOR FOR ELECTRIC VEHICLE

(75) Inventor: Kyu-Yeon Yeon, Yongin-si (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 0 days.

(21) Appl. No.: 13/223,433

(22) Filed: Sep. 1, 2011

(30) Foreign Application Priority Data

Sep. 8, 2010 (KR) .......................... 10-2010-0087983

(51) Int. Cl.
*H01R 13/648* (2006.01)
(52) U.S. Cl. ........................................... 439/101
(58) Field of Classification Search ............... 439/101, 439/483, 484, 3, 135, 144, 274
See application file for complete search history.

(56) References Cited

U.S. PATENT DOCUMENTS

| | | | | |
|---|---|---|---|---|
| 5,593,320 A | * | 1/1997 | Konda et al. | 439/589 |
| 5,807,129 A | * | 9/1998 | Konda et al. | 439/348 |
| 7,530,843 B1 | * | 5/2009 | Tesfay et al. | 439/587 |

* cited by examiner

*Primary Examiner* — Tulsidas C Patel
*Assistant Examiner* — Phuongchi Nguyen
(74) *Attorney, Agent, or Firm* — Sherr & Vanghn, PLLC

(57) ABSTRACT

Provided is a charging connector for an electric vehicle including a connector housing having at least two terminal pin mounting openings, at least two terminal pins inserted into the terminal pin mounting openings such that front ends of the terminal pins are exposed through a front end of the connector housing, a sealing member arranged at the rear of the terminal pins in the connector housing, a support member arranged in front of the sealing member to prevent the sealing member from moving toward the front ends of the terminal pins, the support member having an outer diameter greater than an inner diameter of the sealing member, and a rear holder connected to a rear end of the connector housing in a close contact with a rear end of the sealing member, and having cable insertion openings corresponding to the terminal pins, through which a power cable is inserted.

5 Claims, 5 Drawing Sheets

CHARGING CONNECTOR FOR ELECTRIC VEHICLE

CROSS-REFERENCE TO RELATED APPLICATION(S)

This application claims priority under 35 U.S.C. 119(a) from Korean Patent Application No. 10-2010-0087983, filed on Sep. 8, 2010 in the Korean Intellectual Property Office, the entire disclosure of which is incorporated herein by reference for all purposes.

BACKGROUND

1. Field

The present invention relates to a charging connector for an electric vehicle, and in particularly, to a charging connector for an electric vehicle that has improvement in a support structure and a sealing structure for a terminal pin.

2. Description of the Related Art

An electric vehicle uses an electric power of a battery as a power source, unlike a general vehicle using a fuel such as gasoline or diesel. Accordingly, the electric vehicle is charged by coupling an inlet mounted therein to a coupler of a charger corresponding to the inlet.

Typically, the coupler of the charger has a plurality of terminal pins, and the inlet has terminal pin receiving members corresponding to the terminal pins and a lance to surround and support the terminal pin receiving members.

However, since the terminal pin receiving members and the lance have high manufacturing costs, they tend to be uneconomical. Also, not only is the lance difficult to mold, it is also susceptible to break when connected to the coupler because it is formed by plastic injection molding.

Meanwhile, a cable joint part is formed at the rear of the terminal pins in the coupler of the charger to join a conductor of a cable, and a sealing member of a cylindrical shape having an undulated structure along the outer periphery thereof is fitted into the cable joint part to prevent moisture or impurities from intruding into the conductor while supporting the rear part of the terminal pins.

However, the sealing structure described above has low support performance for the terminal pins. Thus, if the coupler is coupled to the inlet with excessive force or the sealing member is fitted loosely, the sealing member may slide forward along the outer periphery of the terminal pins and the terminal pins may advance further into the coupler.

SUMMARY

The present invention is designed to solve the problems of the prior art, and therefore it is an object of the present invention to provide a charging connector for an electric vehicle that may prevent a sealing member surrounding a cable joint part from sliding inward along terminal pins.

To achieve the object, a charging connector for an electric vehicle according to the present invention may, include a connector housing having at least two terminal pin mounting openings, at least two terminal pins inserted into the terminal pin mounting openings such that front ends of the terminal pins are exposed through a front end of the connector housing, a sealing member arranged at the rear of the terminal pins in the connector housing, a support member arranged in front of the sealing member to prevent the sealing member from moving toward the front ends of the terminal pins, the support member having an outer diameter greater than an inner diameter of the sealing member, and a rear holder connected to a rear end of the connector housing in a close contact with a rear end of the sealing member, and having cable insertion openings corresponding to the terminal pins, through which a power cable is inserted.

Preferably, the terminal pin may be provided with a stopper having an outer diameter relatively greater than an outer diameter of the terminal pin, and the support member may be a cylindrical structure fitted into the terminal pin between the stopper and the sealing member to surround the outer periphery of the terminal pin.

The support member may further have a plurality of protrusion members protruding from the cylindrical structure and inserted into the sealing member.

Alternatively, the support member may be an integral plate having cylindrical structures protruding therefrom corresponding to the at least two terminal pins.

The sealing member may have the shape of a plate corresponding to the integral plate, and the support member may further have a plurality of protrusion members protruding therefrom and inserted into the sealing member.

ADVANTAGEOUS EFFECTS

The present invention may prevent a sealing member from sliding inward along terminal pins, so that the terminal pins may be stably secured even when a strong coupling is given between a coupler and an inlet for charging an electric vehicle, and a reduction in sealing performance may be prevented.

DESCRIPTION OF THE DRAWINGS

Other objects and aspects of the present invention will become apparent from the following description of embodiments with reference to the accompanying drawing in which.

DETAILED DESCRIPTION OF EXEMPLARY EMBODIMENTS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
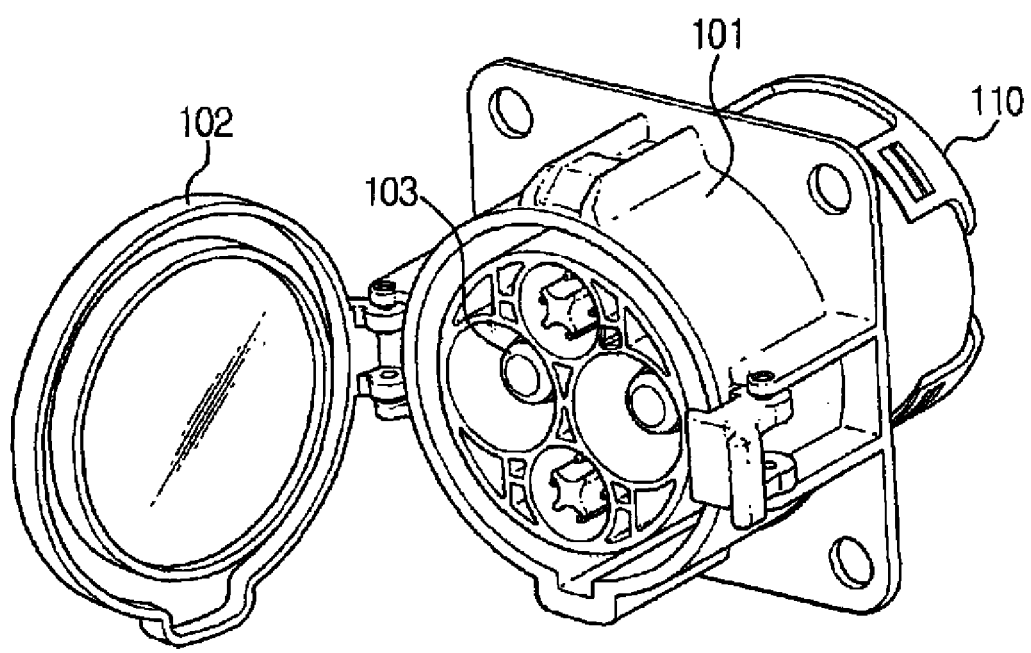
FIG. 1 is a perspective view illustrating a charging connector for an electric vehicle according to a preferred exemplary embodiment of the present invention.
Figure 2:
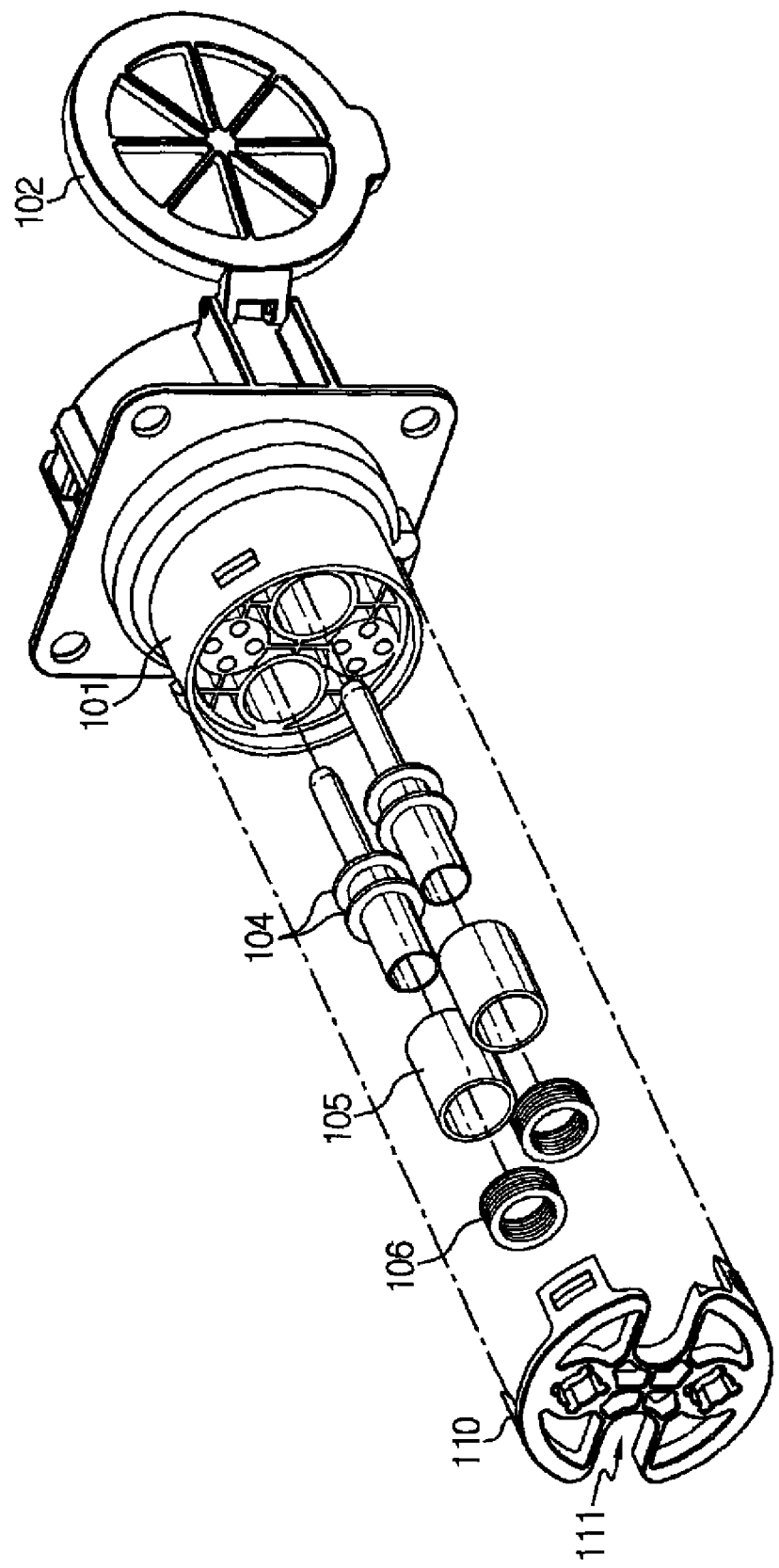
FIG. 2 is an exploded perspective view of FIG. 1.
Figure 3:
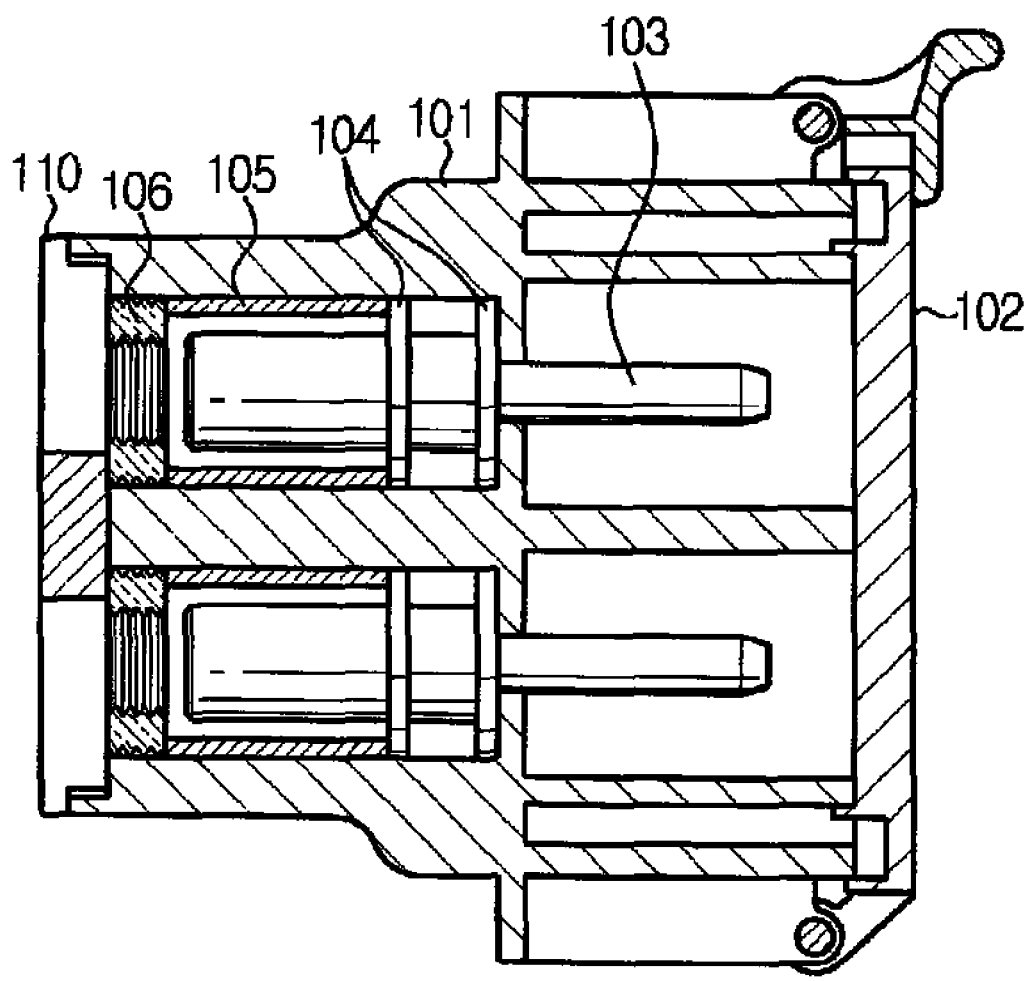
FIG. 3 is a cross-sectional view of FIG. 1.

FIG. 1 is a perspective view illustrating a charging connector for an electric vehicle according to a preferred exemplary embodiment of the present invention. FIG. 2 is an exploded perspective view of FIG. 1. FIG. 3 is a cross-sectional view of FIG. 1.

Referring to FIGS. 1 to 3, the charging connector for an electric vehicle according to a preferred exemplary embodiment of the present invention may include a connector housing 101 having terminal pin mounting openings (not shown), conductive terminal pins 103 inserted into the terminal pin mounting openings, sealing members 106 arranged at the rear of the terminal pins 103 to provide a sealing function, support members 105 arranged in front of the sealing members 106 to support the sealing members 106, and a rear holder 110 connected to a rear end of the connector housing 101.

The charging connector for an electric vehicle according to the present invention may be formed in the type of an inlet mounted at the side of the electric vehicle or a coupler provided at the side of a charger corresponding to the inlet. Hereinafter, the present invention will be described in detail based on an inlet type-charging connector for an electric vehicle.

The connector housing 101 may be detachably connectable to a coupler (200 of FIG. 5) of a charger. A front cover 102 may be hinge joined to a front end of the connector housing 101 to selectively expose a front part of the connector housing 101 into which the coupler 200 is inserted.

At least two terminal pin mounting openings may be formed within the connector housing 101 extending in a longitudinal direction of the connector housing 101.

At least two terminal pins 103 may be inserted into the terminal pin mounting openings through the rear end of the connector housing 101, and may have front ends exposed through the front end of the connector housing 101. The terminal pins 103 may have the same outer diameter. More preferably, the terminal pins 103 may have different outer diameters. Although the terminal pins 103 having a substantially rod-like shape are shown in the drawings, the present invention is not limited in this regard. It is obvious that various changes and modifications may be made to the shape of the terminal pins 103.

A cable joint part (not shown) may be provided at the rear of each terminal pin 103 to join a conductor of a cable inserted through the rear end of the connector housing 101.

A stopper 104 may be formed integrally with each terminal pin 103, and have an outer diameter greater than a maximum outer diameter of the terminal pin 103. The stopper 104 may fix the terminal pin 103 to the connector housing 101 to prevent the terminal pin 103 from moving in a longitudinal direction.

The sealing member 106 may be fitted into the cable joint part located at the rear of the terminal pin 103 to provide a sealing function, thereby preventing moisture or impurities from intruding into the conductor while substantially supporting the rear of the terminal pin 103. Preferably, the sealing member 106 may be made from soft rubber or silicon in the shape of a ring or cylinder along which the outer periphery an undulated structure is formed.

The support member 105 may be arranged between the sealing member 106 and the stopper 104 to prevent the sealing member 106 from moving toward the front end of the terminal pin 103 along the terminal pin 103. The support member 105 may have an outer diameter relatively greater than an inner diameter of the sealing member 106.

Specifically, the support member 105 may be provided in the shape of a cylindrical structure, into which the terminal pin 103 is inserted, to surround the outer periphery of the rear part of the terminal pin 103. In this case, the support member 105 may preferably have an outer diameter relatively greater than an inner diameter of the sealing member 106 and an inner diameter relatively smaller than an outer diameter of the sealing member 106. The support member 105 described above may comprise a cylindrical structure having a length designed to the standards of the connector housing 101 and the terminal pin 103, thereby conveniently responding to various changes in the design of the connector. Although not shown in the drawings, a plurality of protrusion members may protrude from one end of the cylindrical structure of the support member 105 and may be inserted into the sealing member 106 to improve the coupling between the support member 105 and the sealing member 106.

Alternatively, the support member 105 may be formed integrally with the terminal pin 103. In this case, the support member 105 may be spaced away from the stopper 104 at a predetermined distance and extend toward the rear end of the terminal pin 103, and may have an outer diameter relatively greater than a maximum outer diameter of the terminal pin 103.

The sealing member 106 and the support member 105 may be provided on various standards in accordance with the outer diameter of the terminal pin 103.

The rear holder 110 may be connected to the rear end of the connector housing 101 in close contact with the rear end of each sealing member 106 in a lump. The rear holder 110 may provide functions of finally supporting an assembly of the terminal pin 103, the support member 105 and the sealing member 106 and of capping the rear end of the connector. The rear holder 110 may be detachably connectable to the rear end of the connector housing 101 by a predetermined hook structure. The rear holder 110 may have a plurality of cable insertion openings 111 corresponding to the terminal pins 103, through which a power cable is inserted.

Figure 4:
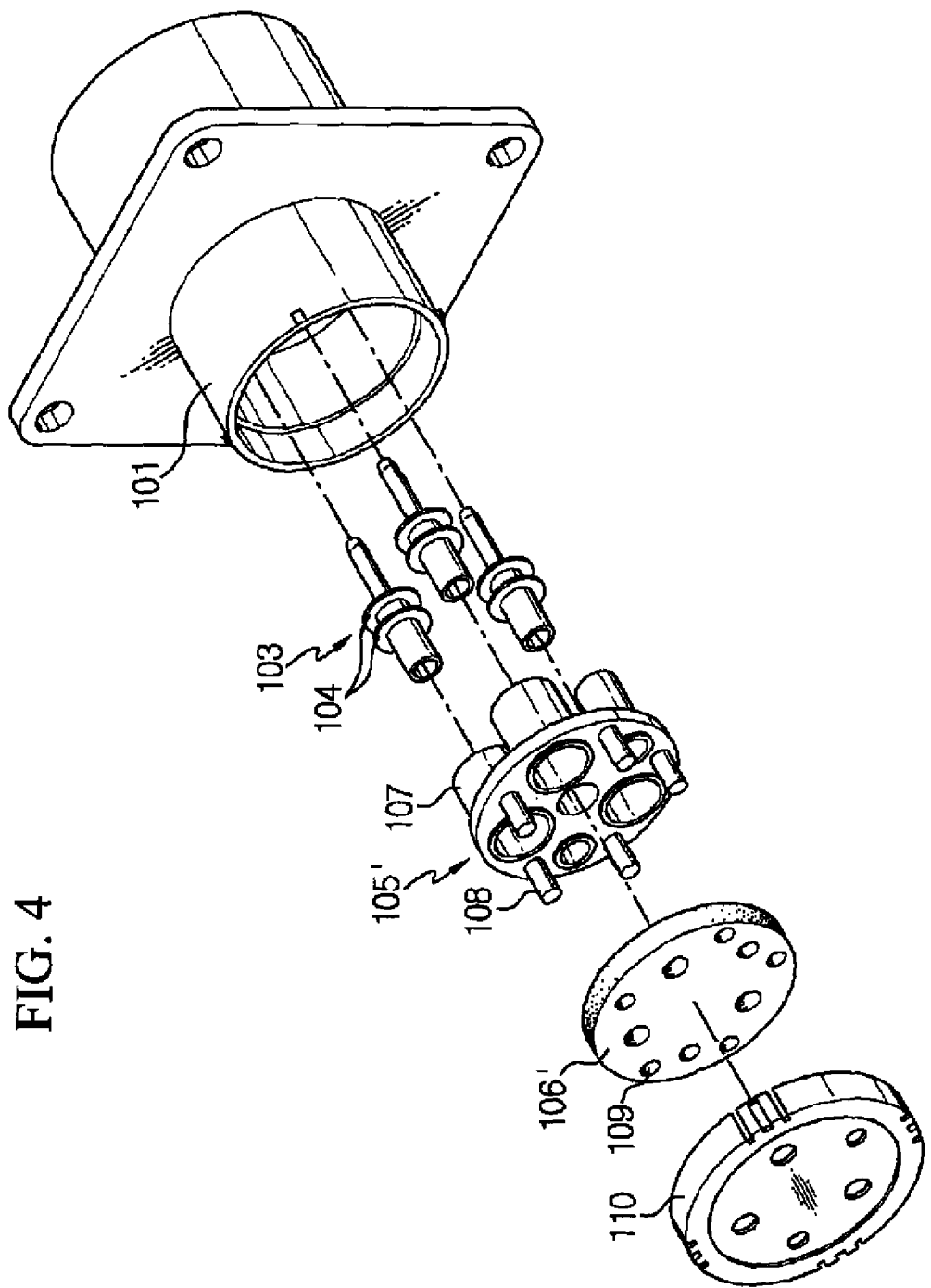
FIG. 4 is an exploded perspective view illustrating a charging connector for an electric vehicle according to another preferred exemplary embodiment of the present invention.

FIG. 4 is an exploded perspective view illustrating a charging connector for an electric vehicle according to another preferred exemplary embodiment of the present invention. The charging connector for an electric vehicle according to another preferred exemplary embodiment of the present invention may include a sealing member 106' and a support member 105' that each provides integrated functions for a plurality of terminal pins 103 and conductors of a cable corresponding to the terminal pins 103.

Referring to FIG. 4, the support member 105' may take the shape of a circular plate as a whole, in particular, an integral plate provided with cylindrical structures 107 protruding therefrom corresponding to at least two terminal pins 103. Each of the cylindrical structures 107 may have substantially the same functions as the support member 105 of a cylindrical structure according to the above-described embodiment. The cylindrical structures, 107 of the support member 105' may be fitted into the corresponding terminal pins 103 to surround the outer periphery of the terminal pins 103.

The support member 105' may have a plurality of protrusion members 108 vertically protruding relative to the plane thereof. The protrusion members 108 may be inserted into the sealing member 106' to improve the coupling between the support member 105' and the sealing member 106'.

The sealing member 106' may take the shape of a circular plate corresponding to the integral plate. Preferably, the sealing member 106' may comprise a rubber plate. The sealing member 106' may have through holes 109 into which the protrusion members 108 protruding from the support member 105' are inserted.

The rear holder 110 may be connected to the rear end of the connector housing 101 in a surface-contact with the rear surface of the sealing member 106' to provide functions of finally supporting an assembly of the terminal pins 103, the support member 105' and the sealing member 106' and of capping the rear end of the connector.

Figure 5:
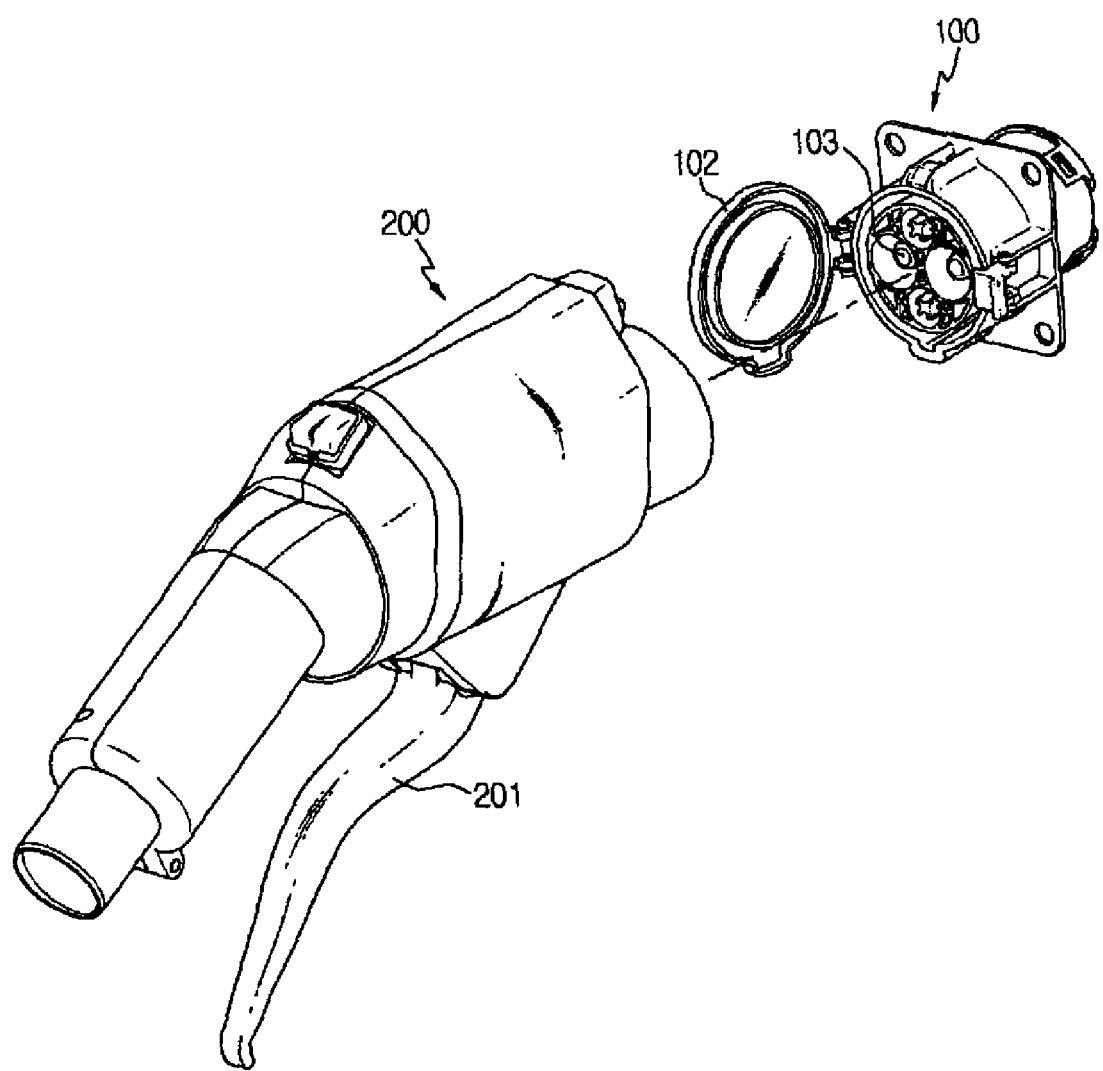
FIG. 5 is a perspective view illustrating an exemplary use of a charging connector for an electric vehicle according to the present invention.

As shown in FIG. 5, the inlet-type charging connector 100 for an electric vehicle according to the present invention may form a connector assembly with the coupler 200 of the charger to charge a battery of an electric vehicle. A user may open the front cover 102 of the charging connector 100 mounted in an electric vehicle, place the coupler 200 into the charging connector 100, and pull a lever 201 so that the charging connector 100 is coupled to the coupler 200.

Accordingly, a strong coupling between the charging connector 100 and the coupler 200 may be secured, the terminal pins 103 of the charging connector 100 may be stably supported by the sealing member 106 and 106' and the support member 105 and 105' arranged at the rear thereof to hold a regular position, and the sealing of the cable joint part may be stably maintained by the sealing member 106 and 106'.

Hereinabove, the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The present invention may certainly be used as a slow charging connector for an electric vehicle and also as a quick charging connector requiring a greater number of terminal pins and a stronger coupling than a slow charging connector.

What is claimed is:

1. A vehicle charging connector comprising:
a connector housing having at least two terminal mounting openings;
at least two terminals inserted into the terminal mounting openings such that front ends of the terminals are exposed through a front end of the connector housing;
a sealing member arranged at the rear of the terminals in the connector housing;
a support member arranged in front of the sealing member to prevent the sealing member from moving toward the front ends of the terminals, the support member having an outer diameter greater than an inner diameter of the sealing member; and
a rear holder connected to a rear end of the connector housing in a close contact with a rear end of the sealing member, and having cable insertion openings corresponding to the terminals, through which a power cable is inserted,
wherein the terminal is provided with a stopper having an outer diameter relatively greater than an outer diameter of the terminal, and
the support member is a cylindrical structure fitted into the terminal between the stopper and the sealing member to surround the outer periphery of the terminal.

2. The vehicle charging connector to claim 1,
wherein the support member further has a plurality of protrusion members protruding from the cylindrical structure and inserted into the sealing member.

3. The vehicle charging connector according to claim 1,
wherein the terminal is provided with a stopper having an outer diameter relatively greater than an outer diameter of the terminal, and
the support member is formed integrally with the terminal between the stopper and the sealing member.

4. The vehicle charging connector according to claim 1,
wherein the cylindrical structures corresponding to the at least two terminals protrude from an integral plate.

5. The vehicle charging connector according to claim 4,
wherein the sealing member has the shape of a plate corresponding to the integral plate, and
the support member further has a plurality of protrusion members protruding therefrom and inserted into the sealing member.

* * * * *